United States Patent
Tidemann et al.

(10) Patent No.: US 9,621,896 B2
(45) Date of Patent: Apr. 11, 2017

(54) MACROBLOCK-LEVEL ADAPTIVE QUANTIZATION IN QUALITY-AWARE VIDEO OPTIMIZATION

(75) Inventors: Jeremy Tidemann, Urbana, IL (US); Andrew Penner, Savoy, IL (US)

(73) Assignee: Citrix Systems Inc., Fort Lauderdale, FL (US)

( * ) Notice: Subject to any disclaimer, the term of this patent is extended or adjusted under 35 U.S.C. 154(b) by 843 days.

(21) Appl. No.: 13/492,619

(22) Filed: Jun. 8, 2012

(65) Prior Publication Data

US 2012/0314764 A1 Dec. 13, 2012

Related U.S. Application Data (60) Provisional application No. 61/495,951, filed on Jun. 10, 2011.

(51) Int. Cl.
*H04N 7/26* (2006.01)
*H04N 19/124* (2014.01)
(Continued)

(52) U.S. Cl.
CPC ......... *H04N 19/124* (2014.11); *H04N 19/136* (2014.11); *H04N 19/146* (2014.11);
(Continued)

(58) Field of Classification Search
CPC ......... H04N 19/0009; H04N 19/00139; H04N 19/00278; H04N 19/00472
See application file for complete search history.

(56) References Cited

U.S. PATENT DOCUMENTS

2002/0110193 A1 8/2002 Yoo et al.
2002/0181595 A1 12/2002 Obata et al.
(Continued)

FOREIGN PATENT DOCUMENTS

CN 1235428 A 11/1999
CN 1631041 A 6/2005
(Continued)

OTHER PUBLICATIONS

Nakajima et al., "Rate conversion of MPEG coded video by re-quantization process," Proceedings of the International Conference on Image Processing (ICIP), Washington, Oct. 1995, ISBN: 978-0-7803-3122-8.*
(Continued)

*Primary Examiner* — Andy Rao
*Assistant Examiner* — Tyler Edwards
(74) *Attorney, Agent, or Firm* — Finnegan, Henderson, Farabow, Garrett & Dunner LLP (57) ABSTRACT

A method of optimizing an encoded video stream comprising one or more video frames, each video frame comprising a plurality of macroblocks, each macroblock comprising a plurality of pixels. The method includes receiving an encoded macroblock, decoding the encoded macroblock, and extracting a first quantization parameter. The first quantization parameter corresponds to quantization settings originally used for compressing the encoded macroblock. The method also includes computing a second quantization parameter based at least in part on the first quantization parameter, re-encoding the decoded macroblock based on the second quantization parameter, and providing the re-encoded macroblock.

27 Claims, 5 Drawing Sheets

(51) Int. Cl.
H04N 19/176 (2014.01)
H04N 19/136 (2014.01)
H04N 19/146 (2014.01)
H04N 19/154 (2014.01)
H04N 19/40 (2014.01)

(52) U.S. Cl.
CPC ......... *H04N 19/154* (2014.11); *H04N 19/176* (2014.11); *H04N 19/40* (2014.11)

(56) References Cited

U.S. PATENT DOCUMENTS

| | | | |
|---|---|---|---|
| 2003/0095594 A1* | 5/2003 | Laksono | H04N 19/176 375/240.03 |
| 2004/0141732 A1 | 7/2004 | Sugiyama et al. | |
| 2005/0152449 A1* | 7/2005 | Nemiroff | H04N 19/159 375/240.03 |
| 2005/0220188 A1 | 10/2005 | Wang | |
| 2005/0232354 A1 | 10/2005 | Chen | |
| 2008/0065965 A1 | 3/2008 | Hannuksela | |
| 2009/0106356 A1 | 4/2009 | Brase et al. | |
| 2009/0213930 A1 | 8/2009 | Ye et al. | |
| 2009/0232220 A1 | 9/2009 | Neff et al. | |
| 2010/0061448 A1 | 3/2010 | Zhou et al. | |
| 2010/0166060 A1 | 7/2010 | Ezure et al. | |
| 2010/0254451 A1 | 10/2010 | Melnyk et al. | |
| 2011/0090953 A1 | 4/2011 | Melnyk et al. | |

FOREIGN PATENT DOCUMENTS

| | | | |
|---|---|---|---|
| EP | 1727371 A1 | 11/2006 | |
| EP | 2061241 A1 | 5/2009 | |
| WO | WO 97/37322 | 10/1997 | |
| WO | 2008/098249 | 8/2008 | |
| WO | WO 2009/105732 | 8/2009 | |
| WO | WO 2010/117432 | 10/2010 | |
| WO | WO 2010117432 A2 * | 10/2010 | ........... H04N 19/172 |

OTHER PUBLICATIONS

Puri et al., "Motion-Compensated Video Coding with Adaptive Perceptual Quantization," IEEE Transactions on Circuits and Systems for Video Technology, IEEE Service Center, US, vol. 1, No. 4, Dec. 1991, ISSN: 1051-8215.*

Nakajima, Y, et al., "Rate Conversion of MPEG Coded Video by Re-Quantization Process," Proceedings of the International Conference on Image Processing (ICIP), Washington, D.C., Oct. 23-26, 1995, IEEE Comp. Soc. Press, US, vol. 3, Oct. 23, 1995, pp. 408-411.
Al-Khrayshah, M., "A Real-Time SNR Scalable Transcoder for MPEG-2 Video Streams," Eindhoven University of Technology, Master Informatica Computer Science Engineering (CSE) Afstudeerverslagen; Jan. 1, 2009, pp. 1-80.
Puri, A, et al. "Motion-Compensated Video Coding with Adaptive Perceptual Quantization," IEEE Transactions on Circuits and Systems for Video Technology, IEEE Service Center, vol. 1, No. 4, Dec. 1, 1991, pp. 351-361.
Lei, Z, et al. "Rate Adaptation Transcoding for Precoded Video Streams," ACM 2002, Dec. 1, 2002-Dec. 6, 2002, pp. 127-135.
PCT Notification of Transmittal of the International Search Report and the Written Opinion of the International Searching Authority for International Application No. PCT/US2012/041691, mailed Oct. 5, 2012, 20 pages.
Sullivan, G.J., et al., "Rate-Distortion Optimization for Video Compression," IEEE Signal Processing Magazine, vol. 15, No. 6, Nov. 1, 1998, pp. 74-90 XP011089821.
PCT Notification of Transmittal of the International Search Report and Written Opinion of the International Searching Authority for International Application No. PCT/US2010/000988, mailed Nov. 19, 2010, 24 pages.
Bibliographic data of Japanese Publication No. JP 2011514056; publication date Apr. 28, 2011 for Qualcomm, Inc. (2 pgs).
International Search Report and the Written Opinion for International Application No. PCT/US2010/002762, mailed May 19, 2011, 18 pgs.
International Preliminary Report on Patentability for International Application No. PCT/US2010/002762, mailed Apr. 26, 2012, 10 pgs.
Communication pursuant to Article 94(3) EPC for European Application No. 10713807.5, Oct. 26, 2012, 7 pgs.
English translation and First Chinese Office Action for Application No. 201080057336.1 dated Feb. 12, 2015; 33 pages.
English translation and Second Chinese Office Action for Application No. 201080057336.1 dated Sep. 23, 2015; 31 pages.
Summons to Attend Oral Proceedings for European Application No. 10776446.6; mailed Sep. 22, 2016; 7 pages.
First Chinese Office Action for Application No. 201280039090.4 issued by the State Intellectual Property Office of the People's Republic of China on Aug. 1, 2016, with English translation, 20 pages.

* cited by examiner

MACROBLOCK-LEVEL ADAPTIVE QUANTIZATION IN QUALITY-AWARE VIDEO OPTIMIZATION

CROSS REFERENCE TO RELATED PATENTS

This application claims the priority and benefit of U.S. Provisional Application No. 61/495,951, filed on Jun. 10, 2011, titled "Application of Adaptive Quantization in Quality-Aware Video Optimization," the entire contents of which are incorporated herein by reference.

BACKGROUND INFORMATION

Quantization vs. Perceptual Quality

In video processing, quantization is a lossy compression technique achieved by compressing a range of values to a single quantum value. When a video frame is quantized in any system, information is lost. For example, typical video encoders (e.g., MPEG-2, MPEG-4, H.264, VC-1, etc.) can compress video streams by discarding information that is intended to be perceptually the least significant—information without which the decoded (decompressed) video can still closely resemble the original video. The difference between the original and the decompressed video resulting from quantization is sometimes referred to as "quantization noise." The amount of information discarded during encoding depends on how the video stream is quantized. Each video compression format defines a discrete set of quantization settings, and each quantization setting has an abstract identifier, denoted as a quantization parameter (QP). The QP can be arbitrarily defined as, for example, an integer that indexes an array of quantization settings such that quantization noise introduced by a smaller QP value of X is less than the quantization noise introduced by a larger QP value of X+1. The quantization settings indexed by a given QP value can be different for each video codec.

If too much information is discarded during quantization, the video stream may appear distorted when it is decompressed during playback. This captures the relationship between quantization and perceptual quality. Thus, the QP may be used as an indicator of perceptual quality since the QP indicates how much information is discarded when encoding a video stream. In particular, when the QP value is smaller, more information is retained. As the QP value is increased, however, more information is discarded because some of the information is aggregated so that the bit rate drops, which results in some loss of quality and some increase in distortion.

Quantization vs. Bitrate

Figure 4:
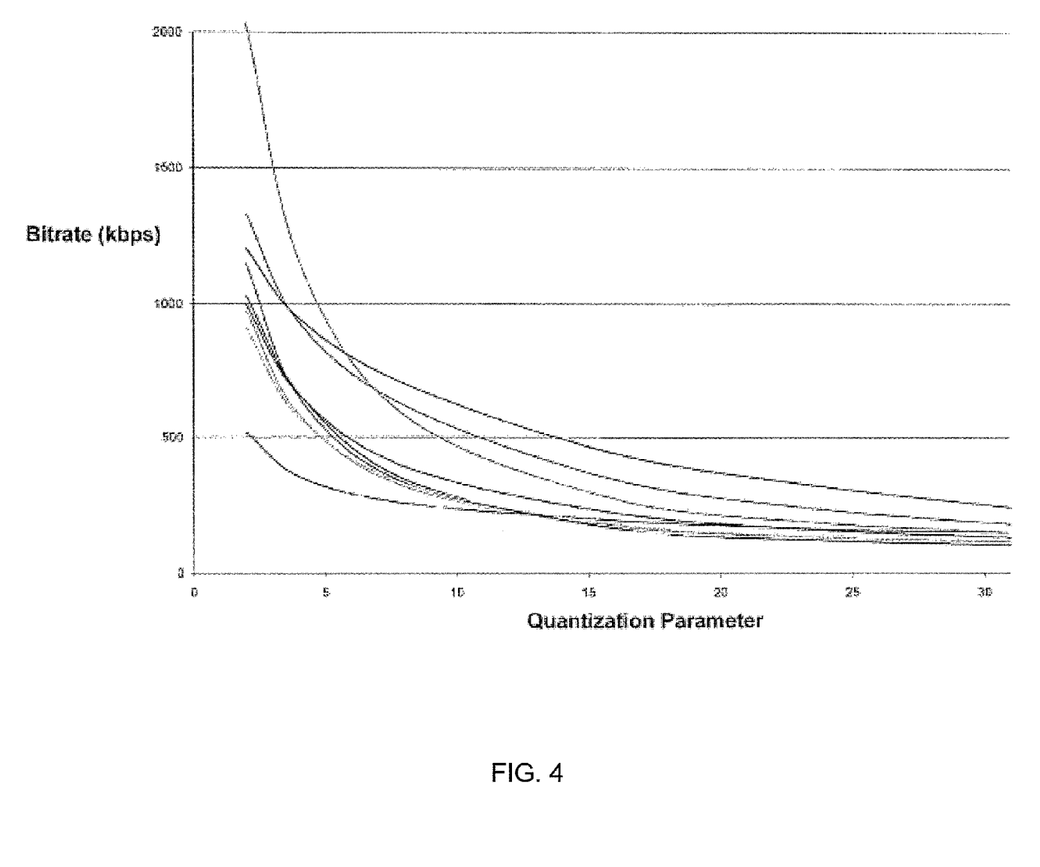
FIG. 4 illustrates exemplary correlation between bitrate and QP for various video streams.

In video processing, bitrate refers to a number of bits used per unit of playback time to represent a continuous video after encoding (data compression). Different sections of a video stream can naturally require a different number of bits to be represented even when they consist of the same number of pixels and are encoded with the same QP. A given section of a video stream quantized with a higher QP value of X+1, however, will never require more bits than the same section quantized with a smaller QP value of X, assuming all other encoding parameters are held constant and assuming a higher QP value represents a coarser quantization (more information loss). In practice, this means that average bitrate requirement decreases when the QP is increased. FIG. 4 shows how the bitrate of an encoded video stream decreases as the QP increases. The bitrate numbers and the QP values in FIG. 4 are just examples. In practice, the numbers and the values can be different and correlation between QP values and bitrate can vary for different video sequences.

The value of QP can be dynamically changed throughout the video stream by the video encoder. For example, each frame within the video stream can be assigned its own QP value, and that value will be used to quantize all pixels within that frame. Frames assigned higher QP values would therefore undergo coarser quantization and result in fewer encoded bits than similar frames quantized with lower QP values. Changing the QP value at a frame level is used by some video encoders, for example, for maintaining an average bitrate of the encoded stream at a relatively constant level—when the bitrate starts to exceed a predefined level, QP value(s) for subsequent frames(s) can be increased, and vice versa, when the bitrate falls below the predefined level, QP value(s) for subsequent frame(s) can be decreased.

Frame-level QP modification, however, does not take into account the fact that the visual information included in a given frame is rarely equally distributed across the frame. More typically, a video frame would have some "flat" regions with relatively constant color and brightness (e.g., sky, grass, water, walls) while other regions would be have more details (e.g., a person's face, a text, or any other object characterized with abrupt color and/or brightness changes). Regions characterized by different levels of detail or pixel variance may also differ significantly in terms of compressibility, that is, to what degree they can be compressed without significant degradation of perceptual quality.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Exemplary embodiments disclosed herein are directed to methods and systems for macroblock-level quality-aware video optimization. Macroblock-level quality-aware video optimization is a technique to modify an encoded video stream on a macroblock level so that the byte size (the bitrate) of the encoded video stream is reduced as much as possible, while simultaneously limiting the perceptual quality degradation to a controllable level.

A framework for macroblock-level quality-aware video optimization can adjust image quantization, allowing, through empirical testing, the fine control of the quality degradation in the byte-reduced content. Through further empirical testing, it is also possible to apply the quantization adjustment optimizations to transcoding scenarios, where the input and output compression formats are different.

Advanced video compression standards today advantageously allow video encoders to assign a different QP value not only to each frame, but also to each macroblock in the frame. A macroblock is a block of pixels within a frame, for example, a block of 16×16 pixels. Video encoders and decoders can divide a frame into multiple adjacent non-overlapping macroblocks and then process (encode or decode) the frame one macroblock at a time. Encoding a macroblock includes, for example, "predicting" the macroblock based on a similar pixel data within the same frame (in intra-prediction mode) or previous/future frame(s) (in inter-prediction mode), obtaining the difference between the prediction and the actual pixel data, transforming the difference into a frequency domain using, for example, a discrete cosine transform (DCT), quantizing the transformed data using a fixed quantization matrix and an adjustable QP value, entropy encoding the quantized data, etc. The encoded data is then stored or transmitted together with the coding parameters that were used to encode it.

The coding parameters include, for example, a QP value that was used for quantizing the macroblock, one or more motion vectors indicating the location of the prediction block(s) in inter-prediction, and any additional information that may be subsequently required by the video encoder to reliably decode the macroblock's encoded data.

The video decoder can decode the encoded data contained in the macroblock using the coding parameters. Decoding the macroblock includes, for example, performing entropy decoding, de-quantizing the entropy-decoded data using the same fixed quantization matrix and the same adjustable QP value, transforming the de-quantized data back to the spatial domain using, for example, inverse discrete cosine transform (IDCT), obtaining and adding back the prediction data, and any additional steps required or optional under a given compression standard.

Figure 1:
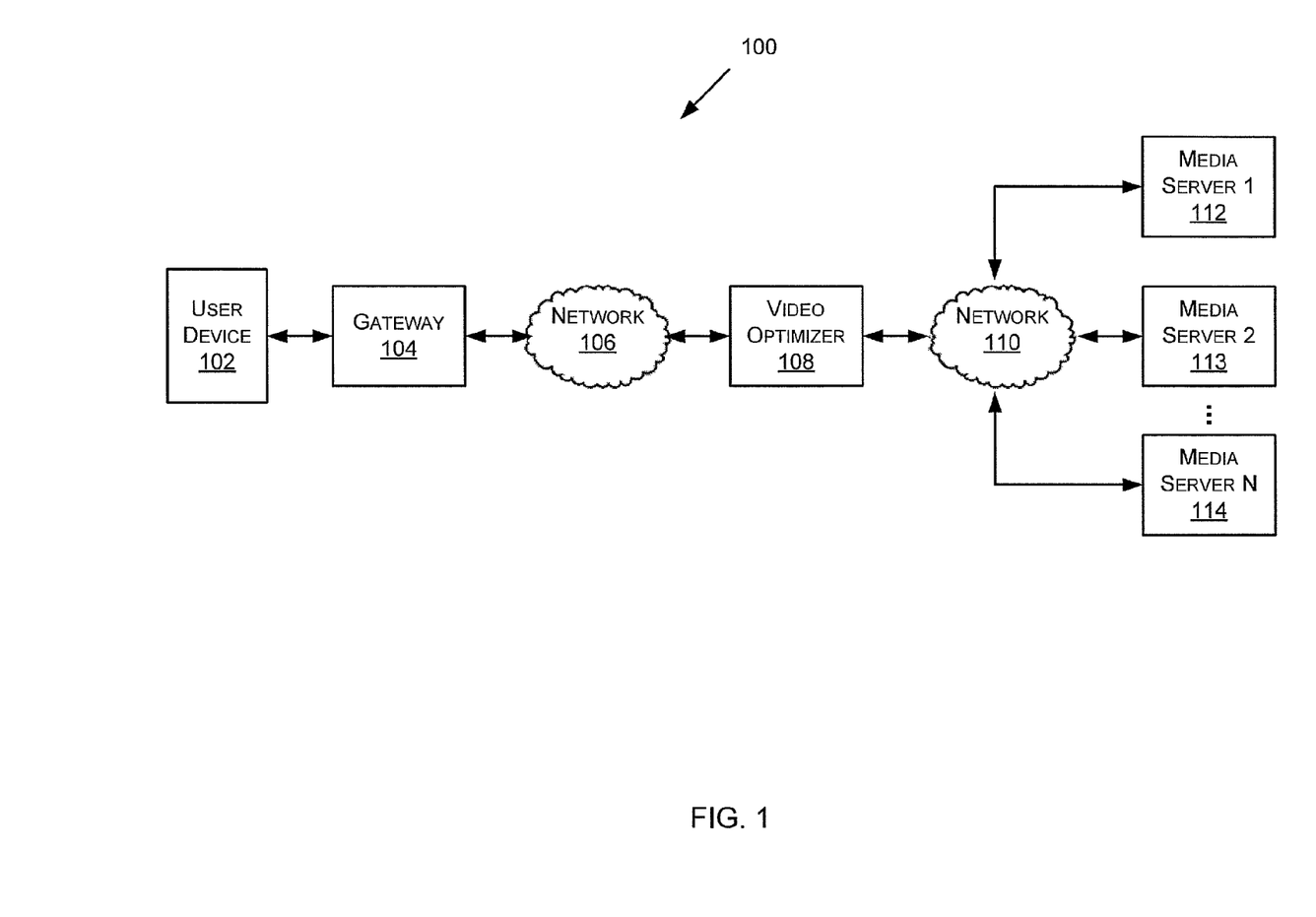
FIG. 1 illustrates a block diagram of an exemplary system.

FIG. 1 illustrates a block diagram of an exemplary system 100. Exemplary system 100 may be any type of system that provides video content over a local connection or a network, such as a wireless network, Internet, broadcast network, etc. Exemplary system 100 may include, among other things, a user device 102, a gateway 104, one or more networks 106 and 110, a video optimizer 108, and one or more media servers 112-114.

User devices 102 can be a hardware device such as a computer, a PDA, a cell phone, a laptop, a desktop, a VCR, a Laserdisc player, a DVD player, blue ray disc player, a television set including a broadcast tuner, or any electronic device capable of accessing a data network and/or capable of playing video. User device 102 can include software applications that allow user device 102 to communicate with and receive video content from a data network, e.g., network 106. For example, user device 102 may send request data to a media server to download a particular video streaming file, and the media server can transmit the video streaming file to user device 102. In some embodiments, the video streaming file may be routed through video optimizer 108. User device 102 may provide a display and one or more software applications, such as a media player, for displaying the video stream to a user of the user device.

In some embodiments, user device 102 can also be or include a storage device for storing or archiving video content. For example, the storage device can be provided as a video CD, DVD, Blu-ray disc, hard disk, magnetic tape, flash memory card/drive, volatile or non-volatile memory, holographic data storage, and any other storage medium.

Gateway 104 is one or more devices that serve as an entrance or a means of access and may or may not convert formatted data provided in one type of network to a particular format required for another type of network. Gateway 104, for example, may be a server, a router, a firewall server, a host, or a video optimizer. For example, gateway 104 may have the ability to transform signals received from user device 102 into signals that network 106 or 110 can understand and vice versa. This transforming ability, however, is not required in some data network, for example, Fourth-Generation (4G) or Worldwide Interoperability for Microwave Access (WiMAX). Gateway 104 may be capable of processing audio, video, and T.120 transmissions alone or in any combination, and is capable of full duplex media translations. Further, gateway 104 can include video optimizer 108 for quality-aware video optimization.

Networks 106 and 110 may include any combination of wide area networks (WANs), local area networks (LANs), or wireless networks suitable for packet-type communications, such as Internet communications, or broadcast networks suitable for distributing video content.

Video optimizer 108 can be implemented as a software program and/or hardware device that provides quality-aware video optimization. Video optimizer 108 is a server that provides communication between user device 102 and media servers 112-114. Video optimizer 108 can perform single-pass, on-the-fly, quality-aware optimization to a previously encoded video frame sequence, as described below. Since the video optimization method only requires one pass over the video frame sequence, video optimizer 108 is well suited to operate in a wide variety of environments. For example, video optimizer 108 can be part of any of media servers 112-114, or any network device between user device 102 and media servers 112-114. In this way, video optimizer 108 optimizes live video feeds before they traverse a low-capacity network segment. Video optimizer 108 can also be installed in front of a storage array to optimize surveillance video before it is archived, thereby saving storage space.

Video optimizer 108 can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers.

Media servers 112-114 can be computer servers that receive a request for video content from user device 102, process the request, and provide video content to user device 102 through, in some embodiments, video optimizer 108. For example, media servers 112-114 can be web servers, enterprise servers, or any other type of computer servers. Media servers 112-114 can be computers programmed to accept requests (e.g., HTTP, RTSP, or other protocols that can initiate a video session) from user device 102 and to serve user device 102 with video stream. Also, media servers 112-114 can be PDAs, cell phones, laptops, desktops, or any devices configured to transfer video content to user device 102 through, in some embodiments, one or more networks 106 and 110. In addition, media servers 112-114 can be broadcasting facilities, such as free-to-air, cable, satellite, and other broadcasting facilities, for distributing video content to user device 102 through, in some embodiments, video optimizer 108. Further, media servers 112-114 can be video sources, such as surveillance devices configured to capture videos and transfer the captured videos to user device 102 through, in some embodiments, video optimizer 108. Also, as an alternative to the configuration of system 100 shown in FIG. 1, any of media servers 112-114 can include video optimizer 108 for quality-aware video optimization.

Figure 2:
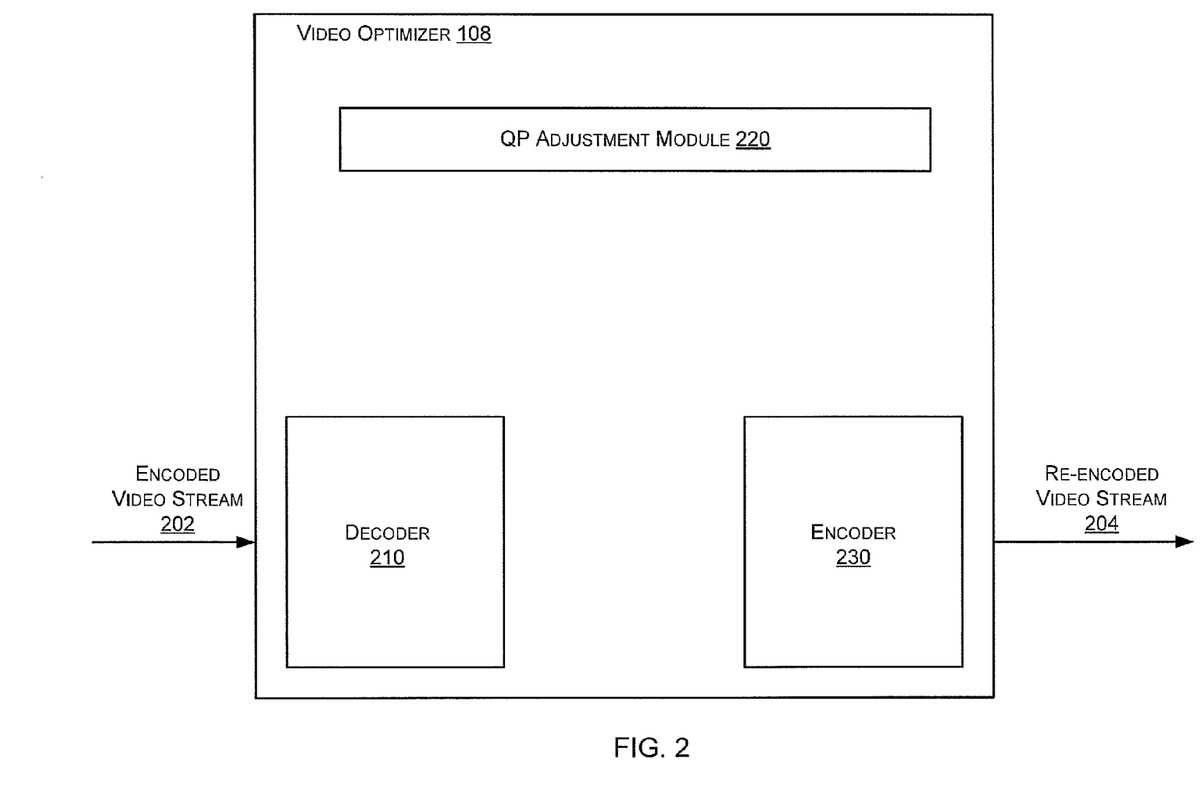
FIG. 2 is a block diagram illustrating an embodiment of an exemplary macroblock-level quality-aware video optimizer in the exemplary system of FIG. 1.

FIG. 2 is a block diagram illustrating an embodiment of an exemplary macroblock-level quality-aware video optimizer 108 in the exemplary system of FIG. 1. For simplicity, FIG. 2 only illustrates a video optimizer 108, encoded video stream 202 as input, and re-encoded video stream 204 as output. Video optimizer 108 may include, among other things, a decoder 210, a QP adjustment module 220, and an encoder 230. The illustrated configuration of video optimizer 108 is exemplary only, and can be modified to provide discrete elements or combine multiple elements into a single one, and be provided as any combination of hardware and software components.

Decoder 210 can be a software program and/or a hardware device configured to decode the incoming encoded video stream 202. Encoded video stream 202 contains one or more frames, where each frame consists of one or more macroblocks. For example, a high-definition frame having a resolution of 1920×1080 pixels can be divided into 120× 68=8160 macroblocks, 16×16 pixels each, where the last row of macroblocks is partially "out of bounds". One second of video stream can contain, for example, 30 such frames, i.e., 244,800 macroblocks.

In an embodiment, decoder 210 decodes the incoming encoded video stream 202 one macroblock at a time. Extracting input information embedded within the encoded macroblock (this input information further described below), decoder 210 decodes encoded video stream 202 macroblock by macroblock and forwards the decoded macroblocks to encoder 230. In some embodiments, some decoded macroblocks can be temporarily stored in a data storage (not shown), such as a database or a cache. The data storage can store decoded macroblocks that may be required for decoding future encoded macroblocks, for example, for obtaining intra- or inter-prediction information. Decoder 210 can also provide the input information (including any information derived therefrom) to QP adjustment module 220.

QP adjustment module 220 can be a software program and/or a hardware device having the capability to adjust the input QP value received by video optimizer and output an adjusted QP value. The input QP value can be adjusted according to the input information received from decoder 210, the output information (further described below) received from encoder 230, and measured information (further described below) generated during the video optimization process. After adjusting the QP value, QP adjustment module 220 provides the output QP value (i.e., adjusted QP value) to encoder 230.

Encoder 230 can be a software program and/or a hardware device configured to re-encode a video stream, macroblock by macroblock, after receiving the decoded video stream from decoder 210 and the output QP value from QP adjustment module 220. After re-encoding a macroblock of the video stream, encoder 230 outputs the re-encoded macroblock as part of re-encoded video stream 204. Encoder 230 also provides the output information to QP adjustment module 220.

Figure 3:
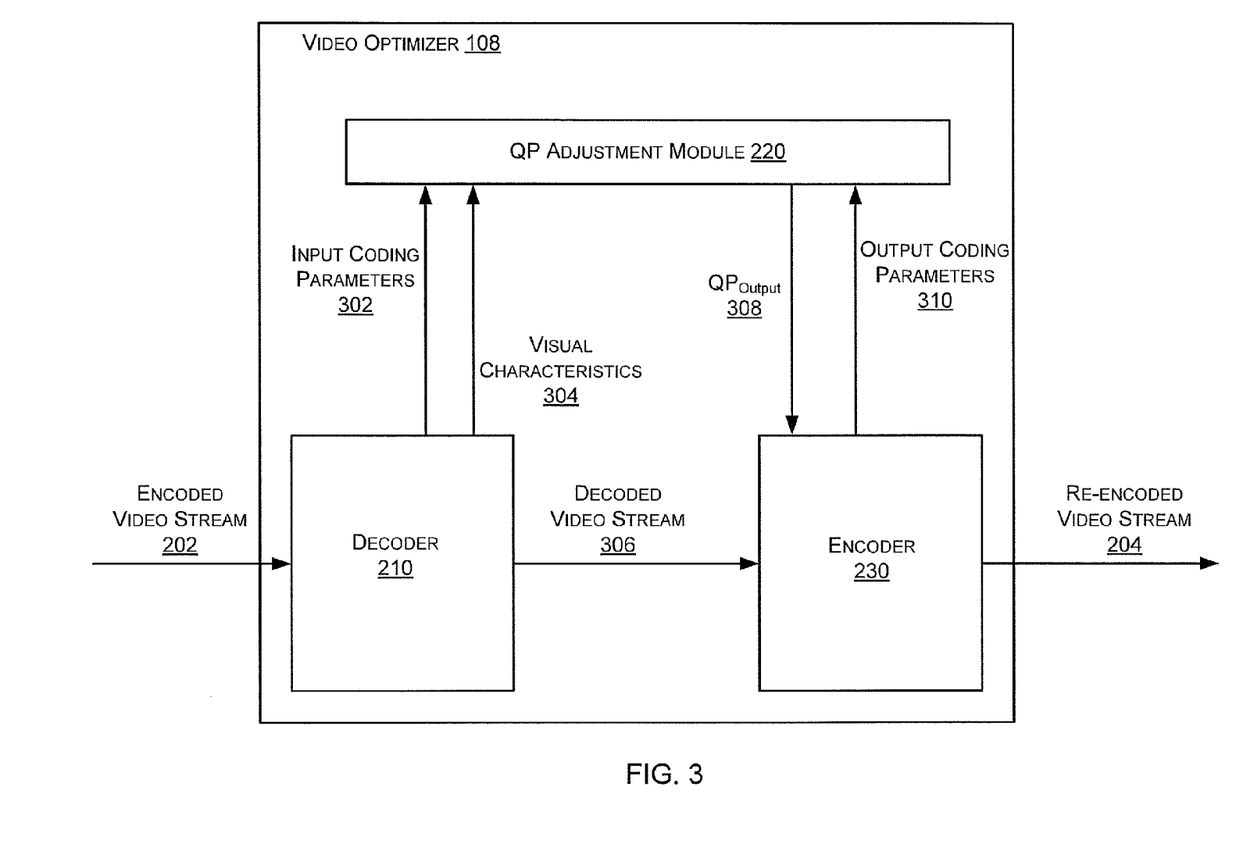
FIG. 3 is a functional diagram illustrating an exemplary process flow in the embodiment of FIG. 2.

FIG. 3 is a functional diagram illustrating an exemplary process flow in the embodiment of FIG. 2. Without departing from the exemplary embodiments, the exemplary process flow can be altered to delete steps, change the order of steps, or include additional steps.

After receiving the encoded video stream 202 from a data network, video optimizer 108 can direct the encoded video stream 202 to decoder 210. Decoder 210 decodes the encoded video stream one macroblock at a time and extracts input information embedded within each encoded macroblock. The input information can include input coding parameters 302 and visual characteristics 304. Upon extraction, the input information is transferred to QP adjustment module 220.

Input coding parameters 302 can include any compression-related information contained in an encoded macroblock, such as the original QP values ("$QP_{Input}$") that were used to quantize the macroblock when it was first encoded, or one or more motion vectors indicating relative positions of one or more prediction blocks, if the macroblock was encoded using inter-prediction. Input coding parameters 302 can also include compression-related statistical information, such as the number of bits that were used to encode the encoded macroblock.

In some embodiments, decoder 210, while decoding the encoded macroblock, also extracts visual characteristics 304, which are then transferred to QP adjustment module 220. Visual characteristics 304 include any information pertaining to the actual (decoded) pixel data of the macroblock, such as the variance or the average brightness of macroblock's pixels.

Besides receiving input information, QP adjustment module 220 can also receive output information. Output information can include output coding parameters 310 extracted from the re-encoded video stream 204. In some embodiments, encoder 230 transfers to QP adjustment module 220 output coding parameters 310 extracted from the re-encoded macroblocks that make up the re-encoded video stream 204. Output coding parameters 310 include any compression-related information incorporated by encoder 230 into re-encoded macroblocks, such as $QP_{Output}$ values, motion vectors, prediction modes, and so forth. (Instead of receiving previously computed $QP_{Output}$ values from encoder 230, in some embodiments, QP adjustment module 220 can temporarily store the values, for example, in an internal buffer). Output coding parameters 310 can also include statistical information related to the compression of re-encoded macroblocks, such as the number of bits occupied by the re-encoded macroblocks.

The types of parameters included in input coding parameters 302 may or may not match the types of parameters included in output coding parameters 310, depending on which types of parameters were used in encoded video stream 202 and are used in re-encoded video stream 204, and depending on what kind of information is requested by QP adjustment module 220. For example, encoded video stream 202 may have been encoded using a compression standard that does not support macroblock-level QP adjustment, while it is supported by the standard being used by encoder 230 for re-encoded video stream. In this example, input coding parameters 302 can only include a frame-level QP value (repeated for each decoded macroblock, as explained below), while output coding parameters 310 can include all the individual macroblock-level QP values, if requested by QP adjustment module 220.

In some embodiments, encoded video stream 202 does not include individual QP values for its macroblocks, but only includes frame-level QP values, where each frame is assigned a single QP value, and that value is used to quantize all macroblocks within that frame. In that case, to facilitate the macroblock-by-macroblock operation of video optimizer 108, decoder 210 can still provide $QP_{Input}$ value as part of input coding parameters 302 for each decoded macroblock, by transferring the same frame-level QP value for each macroblock that belongs to that frame.

In some embodiments, QP adjustment module 220 can also preprocess input coding parameters 302 received from decoder 210. For example, QP adjustment module 220 can perform a statistical analysis and obtain an average value of $QP_{Input}$ or an average motion vector length, across all previously decoded macroblocks belonging to a certain frame Similarly, QP adjustment module 220 can calculate, for example, an average number of bits per encoded macroblock, across all previously-decoded macroblocks belonging to a certain frame.

In some embodiments, QP adjustment module 220 can also preprocess output coding parameters 310 received from encoder 230. For example, QP adjustment module 220 can perform a statistical analysis and obtain an average number of bits per macroblock, across all previously re-encoded macroblocks belonging to a certain frame. Similarly, QP adjustment module 220 can calculate an average value of $QP_{Output}$ values (obtained either from an internal buffer or from encoder 230) across all previously re-encoded macroblocks belonging to a certain frame.

In some embodiments, QP adjustment module 220 can also preprocess visual characteristics 304 received from decoder 210. For example, QP adjustment module 220 can perform a statistical analysis and obtain an average value of pixel variance and/or brightness of all previously decoded macroblocks that belong to a certain frame.

Obtaining statistical information may require access to previously received ("historical") information. To enable access to historical information, QP adjustment module 220 can include a database (not shown) for temporarily storing a predefined number of recently received parameters.

In some embodiments, the preprocessing of input coding parameters 302, output coding parameters 310 and/or visual characteristics 304 can occur outside QP adjustment module 220. For example, some or all preprocessing of input coding parameters 302 and/or visual characteristics 304 can be performed by decoder 210 and transferred to QP adjustment module 220. As another example, some or all preprocessing of output coding parameters 302 can be performed by encoder 230 and transferred to QP adjustment module 220.

Quality-Aware Video Optimization: Qp Adjustment

QP adjustment module 220 can compute macroblock-level $QP_{Output}$ values to be used by encoder 230 for quantizing macroblocks of decoded video stream 206. As discussed above, $QP_{Output}$ value can be computed based on any combination of the following data: input coding parameters 302, visual characteristics 304, and output coding parameters 310.

In some embodiments, QP adjustment module 220 derives $QP_{Output}$ for a given macroblock based on the $QP_{Input}$ of that macroblock, which can be received in input coding parameters 302. Since a relationship can be established between a QP value used to quantize a macroblock and perceptual quality of the macroblock, and also between the QP value and the bitrate (number of bits used to encode the macroblock), QP adjustment module 220 can use the difference between $QP_{Input}$ and $QP_{Output}$ to simultaneously control the bitrate reduction and perceptual quality degradation of the macroblock in re-encoded video stream 204.

A parameter $\Delta QP$ can be defined as, for example:

$$\Delta QP = QP_{Output} - QP_{Input}$$

QP adjustment module 220 can choose a $\Delta QP$ value to derive a $QP_{Output}$ that can satisfy the requirement of byte size reduction and preserve, to the extent possible, the original perceptual quality. The smaller the $\Delta QP$ value is, the smaller the $QP_{Output}$ value is, and thus less information will be discarded during encoding—less degradation of perceptual quality. On the contrary, the larger the $\Delta QP$ value is, the larger the $QP_{Output}$ value is, and thus more information will be discarded during encoding—more degradation of perceptual quality.

Two properties of the QP vs. bitrate curve shown in FIG. 4 can be exploited to achieve optimization for an input video stream. The first property to exploit is the fact that a small $\Delta QP$ has little impact on bitrate when the $QP_{Input}$ is high. This is shown on the rightmost, flat part of the curves in FIG. 3. Considering this property, when $QP_{Input}$ for a given macroblock is high, QP adjustment module 220 can decide to maintain $\Delta QP$ at 0 (that is, to keep $QP_{Output} = QP_{Input}$) because increasing $\Delta QP$ would have little impact on bitrate but could have detrimental effect on the perceptual quality of the macroblock.

Sometimes, a zero $\Delta QP$ can still result in degraded perceptual quality. In some embodiments, encoder 230 can re-encode decoded video stream 206 using a completely different compression standard than the one with which encoded video stream 202 was originally encoded. In other embodiments, encoder 230 can use the same compression standard that was originally used, but it may choose a completely different set of coding features or coding decisions. For example, encoded video stream 202 may have been encoded with half-pixel precision for motion compensation, while encoder 230 may choose to re-encode the stream using a quarter-pixel ("Qpel") precision. In some embodiments, encoder 230 can also change the stream's frame rate. The result of any such discrepancies between original encoding and the re-encoding techniques may be that for a given macroblock, a different pixel data is being quantized by encoder 230 than the pixel data that was quantized by the original encoder. Therefore, quantizing the macroblock with the same QP value will not necessarily result in the same bitrate and perceptual quality degradation. Consequently, to reduce the probability of unwanted degradation of perceptual quality, QP adjustment module can sometimes select a negative $\Delta QP$, i.e., choose a $QP_{Output}$ value that is lower than the value of $QP_{Input}$.

The second property to exploit is that a small $\Delta QP$ has a large impact on bitrate when the $OP_{Input}$ is low. This is shown on the leftmost, steep part of the curves in FIG. 4. When $QP_{Input}$ is low, even a small positive $\Delta QP$ will result in large byte reduction. Consequently, in some embodiments, QP adjustment module 220 will select higher $\Delta QP$ (i.e., output higher $QP_{Output}$ values) for lower values of $QP_{Input}$. In order to determine whether $QP_{Input}$ of a particular macroblock is "low" or "high", QP adjustment module 220 can compare $QP_{Input}$ to one or more predefined threshold values. Alternatively, QP adjustment module 220 can compare the $QP_{Input}$ to an average value of $QP_{Input}$, for example, across all macroblocks that belong to a certain frame.

In some embodiments, QP adjustment module 220, when computing $QP_{Output}$ for a macroblock, considers how many bits were used to encode the macroblock in encoded video stream (202). For example, for macroblocks that have already been encoded with very few bits, $\Delta QP \leq 0$ can be selected in order to avoid further degradation of perceptual quality.

In some embodiments, the number of encoded bits is considered in conjunction with the $QP_{Input}$ value of the macroblock. For example, when QP adjustment module determines that a macroblock was quantized with a low $QP_{Input}$ (which could prompt a high $QP_{Output}$) but the macroblock nevertheless resulted in a small number of encoded bits, QP adjustment module 220 can "override" the $QP_{Input}$ based selection and select $\Delta QP \leq 0$. Conversely, when QP adjustment module 220 determines that a high $QP_{Input}$ value resulted in an unusually large number of encoded bits, a positive $\Delta QP$ (high $QP_{Output}$) can be selected. In order to determine whether the number of bits of a particular macroblock is large or small, QP adjustment module 220 can compare it, for example, to one or more predefined threshold values, or to an average number of bits used to encode a macroblock belonging to one or more of previously encoded frames.

In some embodiments, QP adjustment module 220 can take into account pixel variance of a macroblock (i.e., variance among the pixel values of the macroblock), which can be received from decoder 210 as one of visual characteristics 304. High pixel variance can indicate that the macroblock can be further compressed with minimal degradation of perceptual quality, and vice versa, compressing macroblocks with low pixel variance is more likely to degrade perceptual quality. For example, the edge between two macroblocks with low pixel variance is more likely to become visible when quantization for both macroblocks is increased, which can lead to image degradation in the form of "blocking" artifacts. Thus, macroblocks whose pixel variance is, for example, lower than a predefined threshold, or significantly lower than average pixel variance of previously encoded macroblocks, can be quantized with $QP_{Output}$ lower than macroblocks with high variance.

In some embodiments, QP adjustment module 220 takes into account the average brightness of macroblock's pixels, which can be received from decoder 210 as one of visual characteristics 304. Quality defects may be more easily perceived in bright areas of the image. Therefore, QP adjustment module 220 may requantize the macroblock more aggressively (with a higher $QP_{Output}$) when the average brightness of macroblock's pixels is low, and vice versa.

In some embodiments, QP adjustment module 220 takes into account the motion vectors of a macroblock, which can be received from decoder 210 as part of input coding parameters 302. For example, very short motion vectors indicate a low-movement area within the video stream, which QP adjustment module 220 may choose to process with care by selecting, for example, $\Delta QP \leq 0$.

Output coding parameters 310 can also be considered by QP adjustment module 220 when computing $QP_{Output}$. For example, QP adjustment module 220 can monitor the resulting bitrate of re-encoded video stream 204 and adjust subsequent $QP_{Output}$ computations accordingly. For instance, if the average bitrate of re-encoded video stream 204 is too high (e.g., higher than a first predefined target bitrate), QP adjustment module 220 can start compressing subsequent macroblocks more aggressively by choosing higher $QP_{Output}$ values, and vice versa, if the average bitrate of re-encoded video stream 204 is too low (e.g., lower than a second predefined target bitrate), QP adjustment module 220 can start compressing subsequent macroblocks less aggressively by choosing lower $QP_{Output}$ values.

In some embodiments, QP adjustment module 220, by analyzing the information obtained from output coding parameters 310, can improve the accuracy of its subsequent $QP_{Output}$ computations. For example, it may calculate how many bits, on average, result from applying a certain $QP_{Output}$ to a macroblock with a certain number of originally encoded bits. QP adjustment module 220 can then use that information to adjust its $QP_{Output}$ computations, for example, for similar subsequent macroblocks. Generally speaking, QP adjustment module 220 can use information obtained from output coding parameters 310 to analyze past quantization decisions and modify its future quantization decisions based on that analysis. One way of modifying future decisions is by adjusting the various threshold values mentioned above.

Figure 5:
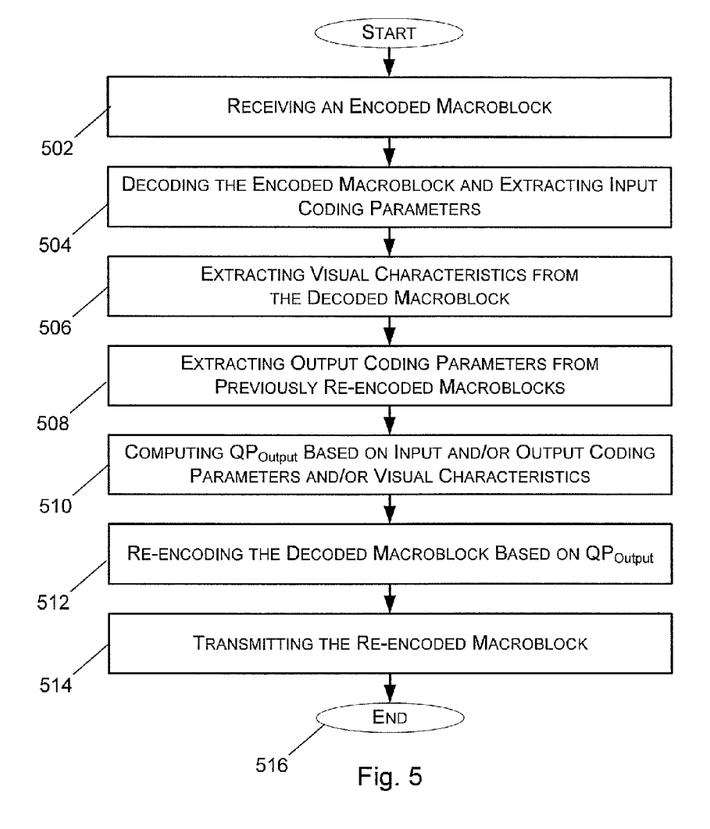
FIG. 5 is a flowchart representing an exemplary method of macroblock-level quality-aware video optimization.

FIG. 5 is a flowchart representing an exemplary method of a macroblock-level quality-aware video optimization. Without departing from the exemplary embodiments, the exemplary process flow can be altered to delete steps, change the order of steps, or include additional steps.

After receiving 502 an encoded macroblock, a video optimizer (e.g., video optimizer 108) decodes 504 the encoded macroblock and extracts input coding parameters (e.g., input coding parameters 302) in the process. In addition, the video optimizer can extract 506 visual characteristics (e.g., visual characteristics 304) from the decoded macroblock, if the visual characteristics are considered when computing $QP_{Output}$ at step 510. In addition, the video optimizer can extract 508 output coding parameters (e.g., output coding parameters 310) from macroblocks previously re-encoded by the video optimizer, if output coding parameters are considered when computing $QP_{Output}$ at step 510.

At step 510, the video optimizer computes $QP_{Output}$ based on the input coding parameters extracted at step 504. The input coding parameters can include $QP_{Input}$—a quantization parameter that was used when the macroblock was originally encoded. In some embodiments, $QP_{Input}$ corresponds to the QP of the frame, which has been applied to all macroblocks of that frame. The video optimizer can, for example, increase $QP_{Output}$ when $QP_{Input}$ is low (e.g., lower than a predefined low threshold) and decrease $QP_{Output}$ when $QP_{Input}$ is high (e.g., higher than a predefined high threshold). In some cases, for example, when $QP_{Input}$ is very high, the video optimizer can set $QP_{Output}$ to a value equal to or lower than $QP_{Input}$.

In some embodiments, the input coding parameters can include the number of bits consumed by the encoded macroblock. The video optimizer can decrease $QP_{Output}$ when the number of bits is low (e.g., lower than a predefined low threshold) and increase $QP_{Output}$ when the number of bits is high (e.g., higher than a predefined high threshold). In some cases, when the number of bits is very low, the video optimizer can set $QP_{Output}$ to a value equal to or lower than $QP_{Input}$. In addition, the video optimizer can consider the number of bits in conjunction with the $QP_{Input}$ value, for example, decreasing $QP_{Output}$ when both $QP_{Input}$ and the number of bits are low, and increasing $QP_{Output}$ when both $QP_{Input}$ and the number of bits are high.

In some embodiments, the input coding parameters can include the variance among pixels of the encoded macroblock. The video optimizer can decrease $QP_{Output}$ when the variance is low (e.g., lower than a predefined low threshold) and increase $QP_{Output}$ when the variance is high (e.g., higher than a predefined high threshold). In some cases, when the variance is very low, the video optimizer can set $QP_{Output}$ to a value equal to or lower than $OP_{input}$.

In some embodiments, the input coding parameters can include the motion vectors used to originally encode the encoded macroblock. The video optimizer can decrease $QP_{Output}$ when the motion vectors are short (e.g., shorter than a predefined low threshold) and increase $QP_{Output}$ when the motion vectors are long (e.g., longer than a predefined high threshold). In some cases, when the motion vectors are very short, the video optimizer can set $QP_{Output}$ to a value equal to or lower than $QP_{Input}$.

In some embodiments, the video optimizer, when computing $QP_{Output}$, can take into account the visual characteristics extracted at step 508. The visual characteristics can include, for example, the average brightness of the encoded macroblock's pixels. The video optimizer can decrease $QP_{Output}$ when the average brightness is high (e.g., higher than a predefined low threshold) and increase $QP_{Output}$ when the average brightness is low (e.g., lower than a predefined high threshold).

In some embodiments, the video optimizer, when computing $QP_{Output}$, can take into account the output coding parameters extracted at step 508. The output coding parameters can include, for example, the average bitrate of previously re-encoded macroblocks. The video optimizer can increase $QP_{Output}$ when the average bitrate is higher than a predefined target bitrate, and decrease $QP_{Output}$ when the average bitrate is lower than a predefined target bitrate. The video optimizer can also use the output coding parameters of previously re-encoded macroblocks to analyze, based on actual results, the relationship between the input coding parameters, the visual characteristics, the selected $QP_{Output}$, and the resulting output coding parameters. For example, the video optimizer can analyze how many bits, on average, were obtained when a macroblock having a certain number of originally encoded bits was re-encoded using a certain $QP_{Output}$ value. As a result of that analysis, the video optimizer can adjust its subsequent $QP_{Output}$ computations to achieve higher accuracy. The adjustment can be accomplished, for example, by modifying the various thresholds mentioned above.

After computing $QP_{Output}$, the video optimizer can re-encode 512 the decoded macroblock by encoding it based on quantization setting corresponding to the computed $QP_{Output}$. The re-encoding can optimize the decompressed macroblock so that the byte size of the compressed macroblock is reduced as much as possible, while simultaneously limiting the perceptual quality degradation to a controllable level. The video optimizer can transmit 514 the re-encoded macroblock to a destination. The method can then end 516.

The methods disclosed herein may be implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

A portion or all of the methods disclosed herein may also be implemented by an application specific integrated circuit (ASIC), a field-programmable gate array (FPGA), a complex programmable logic device (CPLD), a printed circuit board (PCB), a digital signal processor (DSP), a combination of programmable logic components and programmable interconnects, a single central processing unit (CPU) chip, a CPU chip combined on a motherboard, a general purpose computer, or any other combination of devices or modules capable of performing quality-aware video optimization disclosed herein.

In the preceding specification, the invention has been described with reference to specific exemplary embodiments. It will, however, be evident that various modifications and changes may be made without departing from the broader spirit and scope of the invention as set forth in the claims that follow. The specification and drawings are accordingly to be regarded as illustrative rather than restrictive. Other embodiments may be apparent to those skilled in the art from consideration of the specification and practice of the invention disclosed herein.

What is claimed is:

1. A method of macroblock-level quality-aware video optimization of an encoded video stream comprising one or more video frames, each video frame comprising a plurality of macroblocks, each macroblock comprising a plurality of pixels, the method comprising:
receiving an encoded macroblock;
decoding the encoded macroblock;
extracting a first quantization parameter, wherein the first quantization parameter corresponds to quantization settings originally used for compressing the encoded macroblock;
determining first and second thresholds as a function of past input quantization parameters, wherein the past input quantization parameters correspond to quantization settings originally used for compressing a plurality of previously received encoded macroblocks;
computing a second quantization parameter based at least in part on the first quantization parameter, the first and second thresholds, and a number of bits occupied by the encoded macroblock;
re-encoding the decoded macroblock based on the second quantization parameter; and
providing the re-encoded macroblock.

2. The method of claim 1, wherein computing the second quantization parameter comprises setting the second quantization parameter to be equal or lower than the first quantization parameter when the first quantization parameter is higher than the first threshold, and setting the second quantization parameter to be higher than the first quantization parameter when the first quantization parameter is lower than the second threshold.

3. The method of claim 1, wherein computing the second quantization parameter is based in part on visual characteristics of the encoded macroblock or the decoded macroblock.

4. The method of claim 3, wherein the visual characteristics of the encoded macroblock or the decoded macroblock include a variance of the plurality of pixels of either the encoded macroblock or the decoded macroblock.

5. The method of claim 3, wherein the visual characteristics of the encoded macroblock or the decoded macroblock include an average brightness of the plurality of pixels of either the encoded macroblock or the decoded macroblock.

6. The method of claim 1, wherein computing the second quantization parameter is based in part on output coding parameters received from an encoder.

7. The method of claim 6, wherein the output coding parameters include one or more past output quantization parameters that correspond to quantization settings used for re-encoding previously received encoded macroblocks.

8. The method of claim 6, wherein the output coding parameters include an output bitrate, wherein the output bitrate corresponds to an average number of bits occupied by a plurality of previously re-encoded macroblocks.

9. The method of claim 8, wherein computing the second quantization parameter comprises increasing the second quantization parameter if the output bitrate is higher than a first predefined target bitrate, and decreasing the second quantization parameter if the output bitrate is lower than a second predefined target bitrate.

10. A non-transitory computer readable medium storing instructions that, when executed by a computer, cause the computer to perform a method of macroblock-level quality-aware video optimization of an encoded video stream comprising one or more video frames, each frame comprising a plurality of macroblocks, and each macroblock comprising a plurality of pixels, the method comprising:
receiving an encoded macroblock;
decoding the encoded macroblock;
extracting a first quantization parameter, wherein the first quantization parameter corresponds to quantization settings originally used for compressing the encoded macroblock;
determining first and second thresholds as a function of past input quantization parameters, wherein the past input quantization parameters correspond to quantization settings originally used for compressing a plurality of previously received encoded macroblocks;
computing a second quantization parameter based at least in part on the first quantization parameter, the first and second thresholds, and a number of bits occupied by the encoded macroblock;
re-encoding the decoded macroblock based on the second quantization parameter; and
providing the re-encoded macroblock.

11. The non-transitory computer readable medium of claim 10, wherein computing the second quantization parameter comprises setting the second quantization parameter to be equal or lower than the first quantization parameter when the first quantization parameter is higher than the first threshold, and setting the second quantization parameter to be higher than the first quantization parameter when the first quantization parameter is lower than the second threshold.

12. The non-transitory computer readable medium of claim 10, wherein computing the second quantization parameter is based in part on visual characteristics of the encoded macroblock or the decoded macroblock.

13. The non-transitory computer readable medium of claim 12, wherein the visual characteristics of the encoded macroblock or the decoded macroblock include a variance of the plurality of pixels of either the encoded macroblock or the decoded macroblock.

14. The non-transitory computer readable medium of claim 12, wherein the visual characteristics of the encoded macroblock or the decoded macroblock include an average brightness of the plurality of pixels of either the encoded macroblock or the decoded macroblock.

15. The non-transitory computer readable medium of claim 10, wherein computing the second quantization parameter is based in part on output coding parameters received from an encoder.

16. The non-transitory computer readable medium of claim 15, wherein the output coding parameters include one or more past output quantization parameters that correspond to quantization settings used for re-encoding previously received encoded macroblocks.

17. The non-transitory computer readable medium of claim 15, wherein the output coding parameters include an output bitrate, wherein the output bitrate corresponds to an average number of bits occupied by a plurality of previously re-encoded macroblocks.

18. The non-transitory computer readable medium of claim 17, wherein computing the second quantization parameter comprises increasing the second quantization parameter if the output bitrate is higher than a first predefined target bitrate, and decreasing the second quantization parameter if the output bitrate is lower than a second predefined target bitrate.

19. A video optimizer for macroblock-level quality-aware video optimization of an encoded video stream comprising one or more video frames, each frame comprising a plurality of macroblocks, and each macroblock comprising a plurality of pixels, the video optimizer comprising:
a decoder configured to receive an encoded macroblock, to decode the encoded macroblock, and to extract a first quantization parameter, wherein the first quantization parameter corresponds to quantization settings originally used for compressing the encoded macroblock;
a quantization parameter adjustment module configured to:
determine first and second thresholds as a function of past input quantization parameters, wherein the past input quantization parameters correspond to quantization settings originally used for compressing a plurality of previously received encoded macroblocks; and
compute a second quantization parameter based at least in part on the first quantization parameter and a number of bits occupied by the encoded macroblock; and
an encoder configured to re-encode the decoded macroblock based on the second quantization parameter and to provide the re-encoded macroblock.

20. The video optimizer of claim 19, wherein computing the second quantization parameter comprises-setting the second quantization parameter to be equal or lower than the first quantization parameter when the first quantization parameter is higher than the first threshold, and setting the second quantization parameter to be higher than the first quantization parameter when the first quantization parameter is lower than the second threshold.

21. The video optimizer of claim 19, wherein computing the second quantization parameter is based in part on visual characteristics of the encoded macroblock or the decoded macroblock.

22. The video optimizer of claim 21, wherein the visual characteristics of the encoded macroblock or the decoded macroblock include a variance of the plurality of pixels of either the encoded macroblock or the decoded macroblock.

23. The video optimizer of claim 21, wherein the visual characteristics of the encoded macroblock or the decoded macroblock include an average brightness of the plurality of pixels of either the encoded macroblock or the decoded macroblock.

24. The video optimizer of claim 19, wherein computing the second quantization parameter is based in part on output coding parameters received from an encoder.

25. The video optimizer of claim 24, wherein the output coding parameters include one or more past output quantization parameters that correspond to quantization settings used for re-encoding previously received encoded macroblocks.

26. The video optimizer of claim 24, wherein the output coding parameters include an output bitrate, wherein the output bitrate corresponds to an average number of bits occupied by a plurality of previously re-encoded macroblocks.

27. The video optimizer of claim 26, wherein computing the second quantization parameter comprises increasing the second quantization parameter if the output bitrate is higher than a first predefined target bitrate, and decreasing the second quantization parameter if the output bitrate is lower than a second predefined target bitrate.

* * * * *